UNITED STATES PATENT OFFICE.

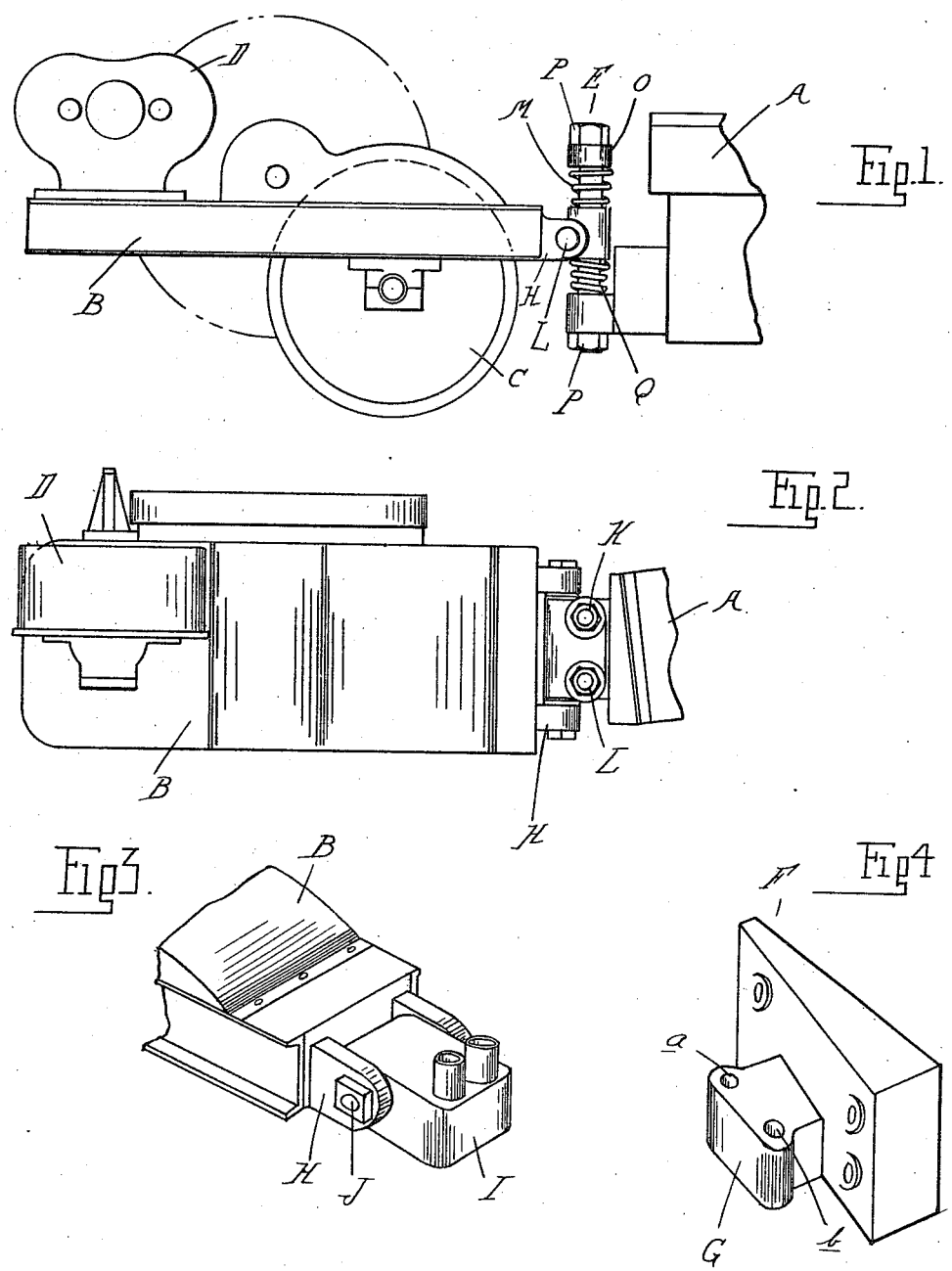

JOSIAH C. FLEMING, OF DETROIT, MICHIGAN, ASSIGNOR TO DETROIT HOIST AND MACHINE COMPANY, OF DETROIT, MICHIGAN, A CORPORATION OF MICHIGAN.

TURN-TABLE-OPERATING MECHANISM.

998,888. Specification of Letters Patent. Patented July 25, 1911.

Application filed September 22, 1910. Serial No. 583,234.

*To all whom it may concern:*

Be it known that I, JOSIAH C. FLEMING, a citizen of the United States of America, residing at Detroit, in the county of Wayne and State of Michigan, have invented certain new and useful Improvements in Turn-Table-Operating Mechanism, of which the following is a specification, reference being had therein to the accompanying drawings.

The invention relates to a turntable construction wherein a tractor is employed for rotating the same, and consists primarily in means for cushioning the impact of one of the members upon the other.

The invention further consists in the construction of the cushioning means, and still further in certain details of construction, and in their novel arrangements and combinations, as will be more fully hereinafter set forth and claimed.

In the drawings illustrating my invention,—Figure 1 is a side elevation of an embodiment thereof; Fig. 2 is a plan view; and Figs. 3 and 4 are detached perspective views of the joint parts.

In the drawings thus briefly described, A represents the turntable, B a tractor of any approved type, including the usual traction wheel C and a suitable motor D for operating the same, and E is a connection,—preferably a hinged joint,—between the parts. In the preferred form illustrated, the connection is composed of an attaching section F rigidly secured to the turntable, including as a part thereof a laterally projecting block member G having vertical apertures *a b* formed therein.

H are spaced horizontally apertured ears upon the forward end of the tractor adjoining the table attachment, and I is a block connected by a horizontal pivot J to the ears, and by bolts K L to the block member of the attachment section F, the bolts passing loosely through the apertures.

As the locomotive moves onto the turntable, the latter is usually depressed a certain amount, causing a sudden pull or shock to be transmitted to the tractor. To obviate this, I have provided means in the form of a cushion for yieldingly opposing the impact of the table upon the tractor primarily upon the downward movement of the table. The preferred form is as illustrated, consisting of springs, as M, interposed between the pivot block I of the connection and bearings or abutments O at the upper ends of the bolts, which are held in place by nuts as P. I also preferably, though not necessarily, employ similar means for opposing the impact upon the upward movement of the table when the engine passes off from the same. Such means are preferably coil springs, as Q, which encircle the bolts intermediate the pivot block I and the attachment block G, as plainly shown in Fig. 1. In the construction illustrated, it will be readily apparent that the cushioning means serve to relieve the impact of the turntable upon the tractor upon vertical movement of the former in either direction, with the result that the tractor will not be appreciably affected by the shock or jar, and consequently the propelling mechanism is protected from injury.

What I claim as my invention is,—

1. In turntable propelling mechanism, the combination with a turntable, of a tractor pivoted thereto, and means at the pivot for cushioning the impact of one upon the other.

2. In turntable propelling mechanism, the combination with a turntable, of a tractor therefor, a connection between the table and tractor including a bodily movable pivot member, and means for yieldingly opposing movement of said member.

3. In turntable propelling mechanism, the combination with a turntable, of a tractor having a pivotal connection therewith, and means for cushioning the impact of the table upon the tractor upon upward movement of the table.

4. In turntable propelling mechanism, the combination with a turntable provided with an attachment section, of a tractor having its forward end adjoining said section, a horizontal pivot uniting the adjacent portions, and means for yieldingly opposing the impact of the table upon the tractor upon vertical movement of the former.

5. In turntable propelling mechanism, the combination with a turntable, of a tractor, a connection between the tractor and turntable including a vertically movable pivot member, and a cushioning member for yieldingly opposing downward movement of said pivot member.

6. The combination with a turntable, of a tractor therefor, an operative connection between the table and tractor including a horizontal pivot member movable bodily in a vertical plane, and means for yieldingly opposing movement of said pivot member in either direction.

7. In turntable propelling mechanism, the combination with a turntable, of a tractor therefor, a vertical pivot uniting the tractor and table, and means encircling the pivot for cushioning the impact of the table upon the tractor.

8. In turntable propelling mechanism, the combination with a turntable, of a tractor vertically pivoted thereto, and a vertically disposed cushioning member interposed between the portions of the turntable and tractor united by the pivot.

9. In turntable propelling mechanism, the combination with a tractor, of a vertically rockable member carried thereby, the turntable, and a vertical pivot uniting the latter with the rock member.

10. In turntable propelling mechanism, the combination with the turntable, of a tractor therefor carrying a vertically rockable member, a vertical pivot pin extending through said member and engaging the turntable, an abutment upon the pin, a spring interposed between the abutment and rock member, and cushioning means positioned between said member and the turntable.

In testimony whereof I affix my signature in presence of two witnesses.

JOSIAH C. FLEMING.

Witnesses:
W. J. BELKNAP,
W. K. FORD.

Copies of this patent may be obtained for five cents each, by addressing the "Commissioner of Patents, Washington, D. C."